Nov. 25, 1930.  A. BRIECHLE  1,782,864
AERIAL CAMERA
Filed Dec. 10, 1929   3 Sheets-Sheet 1

INVENTOR
Ambrosius Briechle
BY Hoguet & Neary
ATTORNEYS

Nov. 25, 1930. A. BRIECHLE 1,782,864
AERIAL CAMERA
Filed Dec. 10, 1929 3 Sheets-Sheet 2

INVENTOR
Ambrosius Briechle
BY
Hoguet + Neary
ATTORNEYS

Nov. 25, 1930.  A. BRIECHLE  1,782,864
AERIAL CAMERA
Filed Dec. 10, 1929   3 Sheets-Sheet 3

INVENTOR
Ambrosius Briechle
BY
Hoquet & Neary
ATTORNEYS.

Patented Nov. 25, 1930

1,782,864

UNITED STATES PATENT OFFICE

AMBROSIUS BRIECHLE, OF NEW YORK, N. Y., ASSIGNOR TO FAIRCHILD AERIAL CAMERA CORPORATION, OF NEW YORK, N. Y., A CORPORATION OF NEW YORK

AERIAL CAMERA

Application filed December 10, 1929. Serial No. 412,980.

This invention relates in general to aerial cameras and more particularly to camera mounting and operating accessories and the relative location thereof.

An object of the invention is to adopt an aerial camera so that it is interchangeable in use as a suspended aerial mapping camera and as a hand held camera for taking oblique pictures.

A further object is to so provide interchangeable hand controlled operating accessories that the maximum ease of operation is obtained in either use to which the camera is subjected.

With the foregoing and other objects in view, the invention consists in the combination of parts and in the details of construction hereinafter set forth in the following specification and appended claims, certain embodiments of my invention being illustrated in the accompanying drawings, in which:

Figure 2:
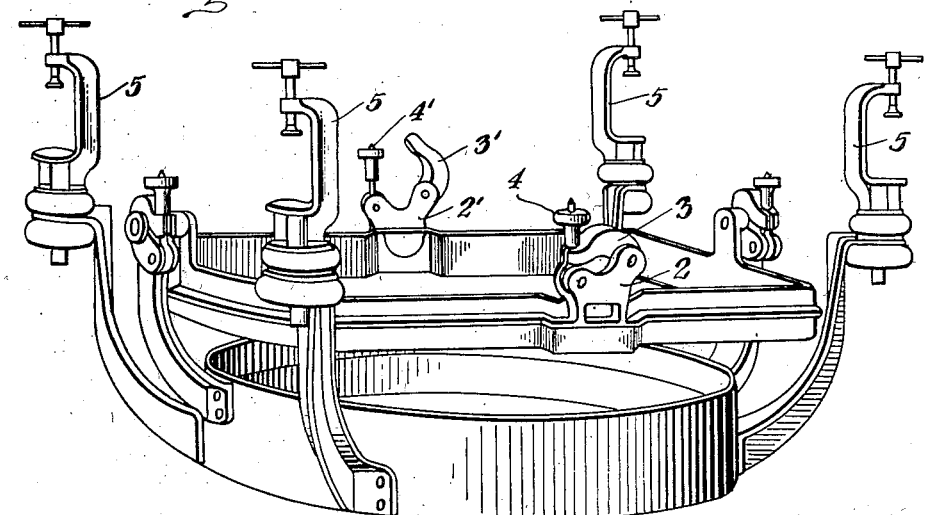
Fig. 2 is a view in perspective of the gimbal mount for supporting the camera in vertical position.

Referring more particularly to the drawings, there is shown in Fig. 2 a conventional type of gimbal frame for universal suspension of the camera, one of the trunnions 1 being shown for reception in a suitable bearing 2 and clamped therein by means of clamping elements 3 and 4, a counterpart being shown at 2', 3' and 4' to receive the camera trunnion 1' on the other side. The disposition of camera elements and the trunnions and gimbal joints and frame is such that the center of gravity of the camera substantially falls within the same plane as the trunnions 1 and 1', thus leaving the camera non-pendulously suspended. The gimbal frame, as a whole, is attached by means of clamps 5 to the fuselage and by known and shown construction allows of universal movement of the camera with respect to the airplane which carries it. This has been found to be ideal for the purpose of utilizing the camera to take pictures for mosaic map work. While in this position the film-winding handle 6 is, as shown in dotted lines, attached to the camera on the pin 7, which is suitably attached to trunnion 1' and falls within the same horizontal plane as both the camera trunnions. This feature is of importance in that the turning of the winding handle has no disturbing effect on the balance of the camera, and consequently makes for less manual adjustment of the positioning of the camera while taking a series of pictures. The lever 8 for manual control of the shutter trip is also located in a convenient place for operation.

Figure 3:
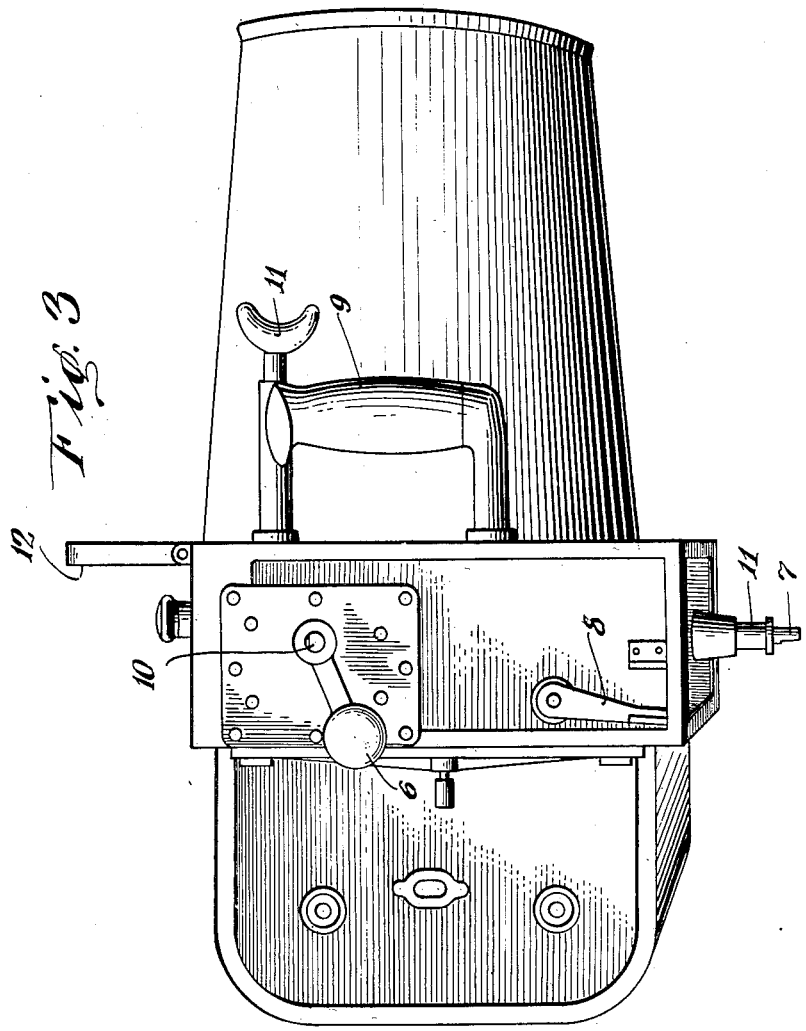
Fig. 3 is a side view of the camera removed from its mount and the winding handle attached in proper position for taking oblique views.
Figure 4:
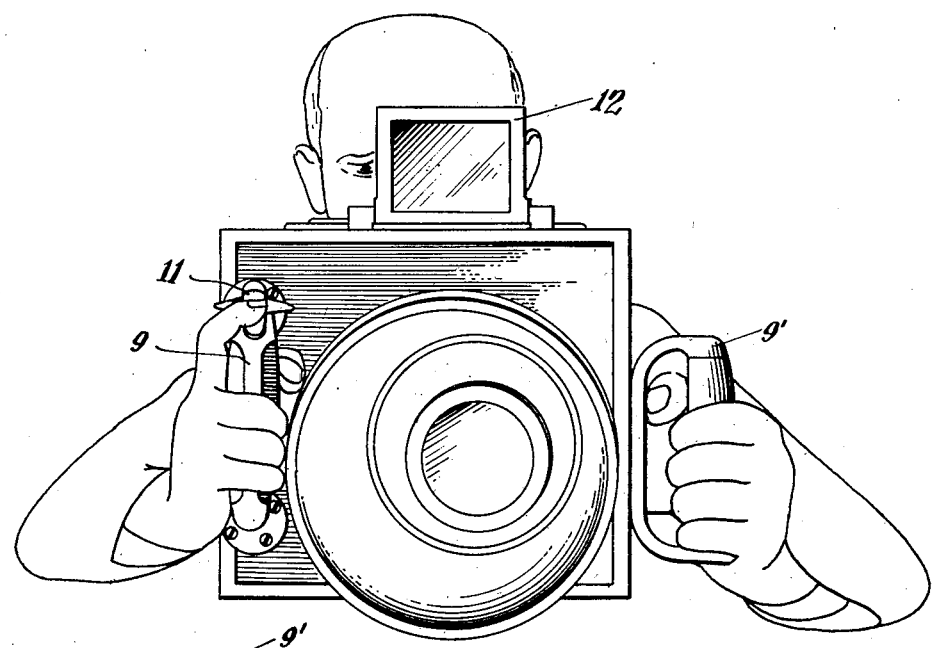
Fig. 4 is a front view of the camera showing an operator holding the camera to take oblique views.
Figure 5:
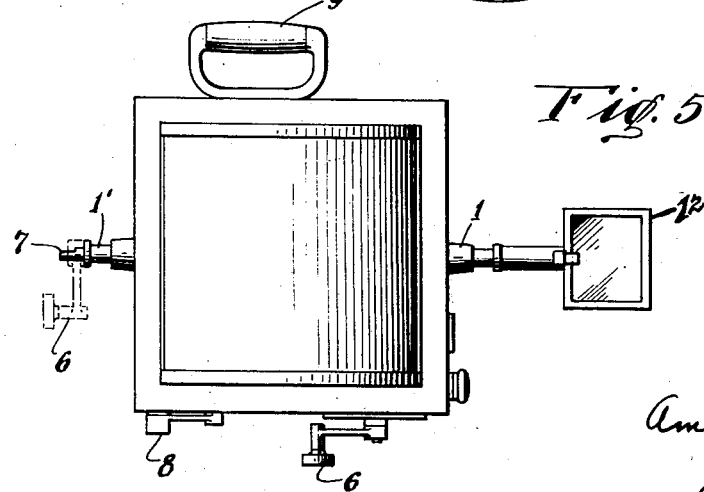
Fig. 5 is a top plan view of the camera, showing the winding handle in position for taking oblique views and also showing the winding handle in dotted lines for taking vertical views.

As shown in Figs. 3 and 4 the camera is removed from the gimbal frame when it is desired to take oblique pictures, and the camera is substantially hand-held by means of the grip handles 9 and 9'. In this instance the winding handle 6 is removed from the pin 7 and attached to the pin 10. The shutter trip lever 8 is in this use of the camera not used and instead thereof there is provided a shutter trip plunger 11 arranged in the gripping handle 9 and is so fashioned as to be easily engaged by the finger while gripping the handle to hold the camera in the desired position, as shown in Fig. 4. In Fig. 5 there is shown the preferred position of the camera view finder 12 on the trunnion 1.

Figure 1:
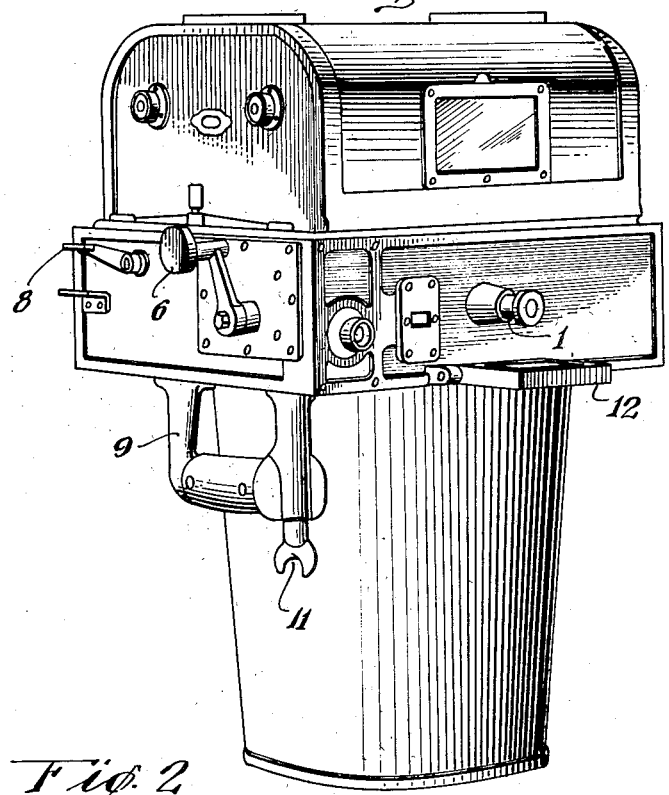
Fig. 1 is a view in elevation of the camera assembly with the magazine cover removed, the camera also being shown mounted in a gimbal frame.

It will readily be understood that the arrangement of the shutter trip and film-winding handle in Fig. 1 makes for the maximum convenience in operation of the vertically disposed camera, whereas this arrangement would be totally inadequate in taking oblique pictures when the camera is pointed at the angle shown in Figs. 3 and 4. The converse of this statement is equally true.

By the above construction the same camera may be shifted very quickly from use as a mapping camera to an oblique camera and vice versa, and this arrangement is of particular advantage, as will be understood by those skilled in the particular art of aerial cameras and their uses.

Having thus described my invention, I claim:

1. In combination with an aerial camera, a plurality of attachments for manual film-winding control handles and a plurality of shutter tripping devices.

2. In combination with an aerial camera adapted to be carried in a gimbal frame, camera supporting trunnions and a film-winding control handle lying substantially within the same lateral plane with each other and with the center of gravity of the camera, a shutter tripping lever arranged in proximity to said handle, the plurality of gripping handles disposed on different sides of said camera for the purpose of manually positioning said camera when removed from said gimbal frame, a shutter tripping plunger control mounted in one of said gripping handles, and a connection above said gripping handle to receive said film-winding handle when said camera is thus hand-held.

3. In combination in an aerial camera, means for supporting said camera so as to be self balanced and capable of universal adjustment in all directions, means for winding operative parts of said camera through the plane of its suspension.

4. In combination in an aerial camera, detachable means for non-pendulously and adjustably supporting said camera, means for winding operative parts of said camera through the plane of its suspension, hand grips for holding said camera when removed from its suspension, a trigger shutter release mounted on one of said hand grips and a winding handle arranged adjacent thereto on the camera body.

In testimony whereof, I have signed my name to this specification this 25th day of November, 1929.

AMBROSIUS BRIECHLE.